(12) United States Patent
Kuhlbach et al.

(10) Patent No.: US 9,435,254 B2
(45) Date of Patent: Sep. 6, 2016

(54) SUPERCHARGED INTERNAL COMBUSTION ENGINE, AND METHOD FOR OPERATING AN INTERNAL COMBUSTION ENGINE OF SAID TYPE

(75) Inventors: Kai Sebastian Kuhlbach, Bergisch Gladbach (DE); Norbert Andreas Schorn, Aachen (DE); Rainer Friedfeldt, Huerth (DE); Guenter Bartsch, Gummersbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 491 days.

(21) Appl. No.: 13/419,014

(22) Filed: Mar. 13, 2012

(65) Prior Publication Data

US 2012/0240573 A1 Sep. 27, 2012

(30) Foreign Application Priority Data

Mar. 25, 2011 (EP) .................................... 11159786

(51) Int. Cl.

| | |
|---|---|
| *F01N 3/10* | (2006.01) |
| *F02B 37/007* | (2006.01) |
| *F02B 37/02* | (2006.01) |
| *F02D 13/02* | (2006.01) |
| *F02D 23/02* | (2006.01) |
| *F01L 1/26* | (2006.01) |
| *F01N 13/10* | (2010.01) |
| *F02B 37/18* | (2006.01) |
| *F01L 1/34* | (2006.01) |
| *F01L 13/00* | (2006.01) |

(52) U.S. Cl.
CPC ............... *F02B 37/007* (2013.01); *F01L 1/26* (2013.01); *F02B 37/02* (2013.01); *F02B 37/025* (2013.01); *F02D 13/0257* (2013.01); *F02D 23/02* (2013.01); *F01L 1/34* (2013.01); *F01L 13/00* (2013.01); *F01N 13/107* (2013.01); *F02B 37/18* (2013.01); *Y02T 10/144* (2013.01); *Y02T 10/18* (2013.01)

(58) Field of Classification Search
CPC .... F02B 37/007; F02B 37/02; F02B 37/025; F02B 37/18; F02D 13/0257; F02D 23/02; F01L 1/26; F01L 13/00; F01L 1/34; F01N 13/107; Y02T 10/144; Y02T 10/18
USPC .................... 60/597, 602, 612; 123/568.11
See application file for complete search history.

(56) References Cited

U.S. PATENT DOCUMENTS

| | | | |
|---|---|---|---|
| 5,199,261 A | 4/1993 | Baker | |
| 6,941,905 B2 * | 9/2005 | Hitomi et al. | ............... 123/58.8 |
| 7,165,403 B2 | 1/2007 | Sun et al. | |
| 2007/0119168 A1 | 5/2007 | Turner | |

FOREIGN PATENT DOCUMENTS

| | | |
|---|---|---|
| DE | 102005054249 A1 | 5/2007 |
| EP | 1645735 A1 | 4/2006 |

(Continued)

*Primary Examiner* — Thomas Denion
*Assistant Examiner* — Matthew T Largi
(74) *Attorney, Agent, or Firm* — Julia Voutyras; Alleman Hall McCoy Russell & Tuttle LLP

(57) ABSTRACT

A supercharged internal combustion engine having at least two exhaust-gas turbochargers is provided. The engine includes a first exhaust manifold and a second exhaust manifold which are permanently connected to one another upstream of the two turbines of the turbochargers via at least one connecting duct which cannot be closed off. In this way, overflow of exhaust from the one exhaust manifold may be transferred to the other exhaust manifold.

18 Claims, 2 Drawing Sheets

(56) References Cited

FOREIGN PATENT DOCUMENTS

| EP | 1880092 | B1 | 2/2010 |
| EP | 2246543 | A1 | 11/2010 |
| JP | 62174537 | A | 7/1987 |

* cited by examiner

SUPERCHARGED INTERNAL COMBUSTION ENGINE, AND METHOD FOR OPERATING AN INTERNAL COMBUSTION ENGINE OF SAID TYPE

RELATED APPLICATIONS

The present application claims priority to European Patent Application No. 11159786.0, filed on Mar. 25, 2011, the entire contents of which are hereby incorporated by reference for all purposes.

FIELD

The disclosure relates to a supercharged internal combustion engine having at least two exhaust-gas turbochargers.

BACKGROUND AND SUMMARY

Internal combustion engines have a cylinder block and at least one cylinder head which are connected to one another to form the cylinders. To control the charge exchange, an internal combustion engine requires control elements—generally in the form of valves—and actuating devices for actuating said control elements. The valve actuating mechanism required for the movement of the valves, including the valves themselves, is referred to as the valve drive. The cylinder head often serves to accommodate the valve drive.

During the charge exchange, the combustion gases are discharged via the outlet openings of the cylinders, and the charging of the combustion chambers, that is to say the induction of fresh mixture or fresh air, takes place via the inlet openings. It is the object of the valve drive to open and close the inlet and outlet openings at the correct times, with a fast opening of the largest possible flow cross sections being sought in order to keep the throttling losses in the inflowing and outflowing gas flows low and in order to ensure charging of the combustion chamber with fresh mixture, and an effective, that is to say complete, discharge of the exhaust gases. Therefore, the cylinders are also often provided with two or more inlet and outlet openings.

According to previous systems, the inlet ducts which lead to the inlet openings, and the outlet ducts, that is to say exhaust lines, which adjoin the outlet openings, are at least partially integrated in the cylinder head. The exhaust lines of the cylinders generally merge to form one common overall exhaust line, or else in groups to form two or more overall exhaust lines. The merging of exhaust lines to form an overall exhaust line is referred to in general and within the context of the present disclosure as an exhaust manifold, with that part of the overall exhaust line which lies upstream of a turbine arranged in the overall exhaust line being considered according to the disclosure as belonging to the exhaust manifold.

Downstream of the manifold, the exhaust gases are in the present case supplied, for the purpose of supercharging of the internal combustion engine, to the turbines of at least two exhaust-gas turbochargers and if appropriate to one or more systems for exhaust-gas aftertreatment.

An exhaust-gas turbocharger comprises a compressor and a turbine which are arranged on the same shaft, with the hot exhaust-gas flow being supplied to the turbine and expanding in said turbine with a release of energy, as a result of which the shaft is set in rotation. Owing to the high rotational speeds, the shaft is usually held in plain bearings. The energy supplied by the exhaust-gas flow to the turbine and ultimately to the shaft is used for driving the compressor which is likewise arranged on the shaft. The compressor delivers and compresses the charge air supplied to it, as a result of which supercharging of the cylinders is obtained. If appropriate, a charge-air cooling arrangement is provided by means of which the compressed combustion air is cooled before it enters the cylinders.

Supercharging serves primarily to increase the power of the internal combustion engine. Here, the air required for the combustion process is compressed, as a result of which a greater air mass can be supplied to each cylinder per working cycle. In this way, the fuel mass and therefore the mean effective pressure can be increased. Supercharging is a suitable means for increasing the power of an internal combustion engine while maintaining an unchanged swept volume, or for reducing the swept volume while maintaining the same power. In any case, supercharging leads to an increase in volumetric power output and an improved power-to-weight ratio. For the same vehicle boundary conditions, it is thus possible to shift the load collective toward higher loads, where the specific fuel consumption is lower.

The configuration of the exhaust-gas turbocharging often poses difficulties, wherein it is basically sought to obtain a noticeable performance increase in all rotational speed ranges. A severe torque drop is however observed in the event of a certain rotational speed being undershot. Said torque drop is understandable if one takes into consideration that the charge pressure ratio is dependent on the turbine pressure ratio. In the case of a diesel engine, for example, if the engine rotational speed is reduced, this leads to a smaller exhaust-gas mass flow and therefore to a lower turbine pressure ratio. This has the result that, toward lower rotational speeds, the charge pressure ratio likewise decreases, which equates to a torque drop.

Here, it would fundamentally be possible for the drop in charge pressure to be counteracted by means of a reduction in the size of the turbine cross section, and the associated increase in the turbine pressure ratio. This however merely shifts the torque drop further in the direction of lower rotational speeds. Furthermore, said approach, that is to say the reduction in size of the turbine cross section, is subject to limits because the desired supercharging and performance increase may be possible without restriction even at high rotational speeds, that is to say in the case of high exhaust-gas quantities.

One measure to increase the torque characteristic of a supercharged internal combustion engine, for example, is a small design of the turbine cross section and simultaneous provision of an exhaust-gas blow-off facility. Such a turbine is also referred to as a wastegate turbine. If the exhaust-gas mass flow exceeds a threshold value, then a part of the exhaust-gas flow is, within the course of the so-called exhaust-gas blow-off, conducted via a bypass line past the turbine. This approach has the disadvantage that the supercharging behavior is inadequate at relatively high rotational speeds or in the case of relatively high exhaust-gas quantities.

The inventors herein have recognized the issues with the above approaches and provide a system to at least partly address them. In one example embodiment, a supercharged internal combustion engine comprises at least one cylinder head with at least two cylinders, wherein each cylinder has at least two outlet openings for discharging exhaust gases, at least one of which outlet openings is designed as an activatable outlet opening, and each outlet opening is adjoined by an exhaust line; a first exhaust manifold in which the exhaust lines of the activatable outlet openings of at least two cylinders merge, to form a first overall exhaust line which is connected to a turbine of a first exhaust-gas turbocharger; and a second exhaust manifold in which the exhaust lines of the other outlet openings of the at least two cylinders merge, to form a second overall exhaust line which is connected to a turbine of a second exhaust-gas turbocharger, wherein the first exhaust manifold and the second exhaust manifold are permanently connected to one another upstream of the two turbines via at least one connecting duct which cannot be closed off.

The torque characteristic of a supercharged internal combustion engine may furthermore be enhanced by means of multiple turbochargers arranged in parallel, that is to say a plurality of turbines of small cross section arranged in parallel, wherein turbines are activated with increasing exhaust-gas quantity.

A supercharged internal combustion engine of the present disclosure includes at least two exhaust-gas turbochargers arranged in parallel, wherein one turbine is designed as an activatable turbine which is acted on with exhaust gas, that is to say activated, only in the case of relatively high exhaust-gas quantities.

Here, it is sought to arrange the turbines as close as possible to the outlet, that is to say the outlet openings of the cylinder in order thereby firstly to be able to make optimum use of the exhaust-gas enthalpy of the hot exhaust gases, which is determined significantly by the exhaust-gas pressure and the exhaust-gas temperature, and secondly to ensure a fast response behavior of the turbochargers. In this connection, it is therefore fundamentally sought to minimize the thermal inertia and the volume of the line system between the outlet openings on the cylinders and the turbines, which may be achieved by reducing the mass and the length of the exhaust lines.

To achieve the above-stated aims, the exhaust lines of at least two cylinders are merged in a grouped manner in such a way that, from each of said cylinders, at least one exhaust line leads to the turbine of the first exhaust-gas turbocharger and at least one exhaust line leads to the turbine of the second exhaust-gas turbocharger.

According to the disclosure, the turbine of the first exhaust-gas turbocharger, that is to say the first turbine, is designed as an activatable turbine, and the outlet openings of the exhaust lines leading to said turbine are—correspondingly—designed as activatable outlet openings. Only in the case of relatively high exhaust-gas quantities are the activatable outlet openings opened, and the first turbine thereby activated, that is to say acted on with exhaust gas, during the course of the charge exchange.

In comparison with embodiments in which a single coherent line system is provided upstream of the two turbines, the above-described grouping, that is to say the use of two mutually separate exhaust manifolds, improves the operating behavior of the internal combustion engine, in particular at low exhaust-gas flow rates, since the line volume upstream of the second turbine, through which exhaust gas flows continuously, is reduced in size by this measure, which is advantageous, in particular improves response behavior, at low loads and rotational speeds, that is to say in the case of low exhaust-gas quantities.

A disadvantage of the above-described internal combustion engine is that the activatable turbine, in the deactivated state, is completely cut off from the exhaust-gas flow, that is to say no exhaust gas whatsoever is supplied to the deactivated turbine. This results from the use of a separate exhaust manifold and the non-opening of the activatable outlet openings in this operating state, that is to say in the case of small exhaust-gas quantities.

As a result of the lack of incident exhaust-gas flow, the rotational speed of the activatable turbine decreases considerably in the event of deactivation. The hydrodynamic lubricating film is depleted or breaks down entirely, such that the formerly purely liquid friction changes to mixed friction, if appropriate to predominant solid body friction. This increases wear, reduces the durability of the exhaust-gas turbocharger and may basically be regarded as a factor with regard to the susceptibility of the charger to faults. In this context, it may also be taken into consideration that the deactivated turbine, too, is subjected to vibrations and shocks during the operation of the internal combustion engine, wherein owing to the lack of a lubricating film, there is no damping of the components which move relative to one another.

Furthermore, it may be taken into consideration that the activatable turbine may be accelerated when it is activated. Even though the rotor of the activatable turbine has relatively low inertia owing to its size or the use of two turbines, the turbine responds only slowly upon activation. A torque demanded by the driver can therefore be provided only with a delay.

In contrast to the previous systems, according to which the two exhaust manifolds are completely separated from one another, it is provided according to the disclosure that the manifolds are connected to one another. For this purpose, at least one connecting duct is provided which cannot be closed off, that is to say is permanently open and which functions as an overflow duct.

Said connecting duct allows some of the exhaust gas to flow over from the second exhaust manifold into the first exhaust manifold even in the case of relatively low exhaust-gas quantities, such that the activatable turbine is acted on with exhaust gas via the second exhaust manifold and connecting duct even in the deactivated, that is to say shut-down state.

Here, there may be supplied to the activatable turbine via the connecting duct only such an amount of exhaust gas that the turbine shaft does not fall below a minimum rotational speed $n_T$. Maintaining a certain minimum rotational speed prevents or lessens the depletion of the hydrodynamic lubricating film in the plain bearing of the shaft of the first charger. Consequently, the measure of supplying a small amount of exhaust gas to the activatable turbine even in the deactivated state has an advantageous effect in terms of the wear and the durability of the exhaust-gas turbocharger. Furthermore, the response behavior of the activatable turbine and of the supercharging as a whole is improved, because the activatable turbine is accelerated from a higher rotational speed when activated. A torque demanded by the driver can be provided comparatively quickly, that is to say with only a small delay.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
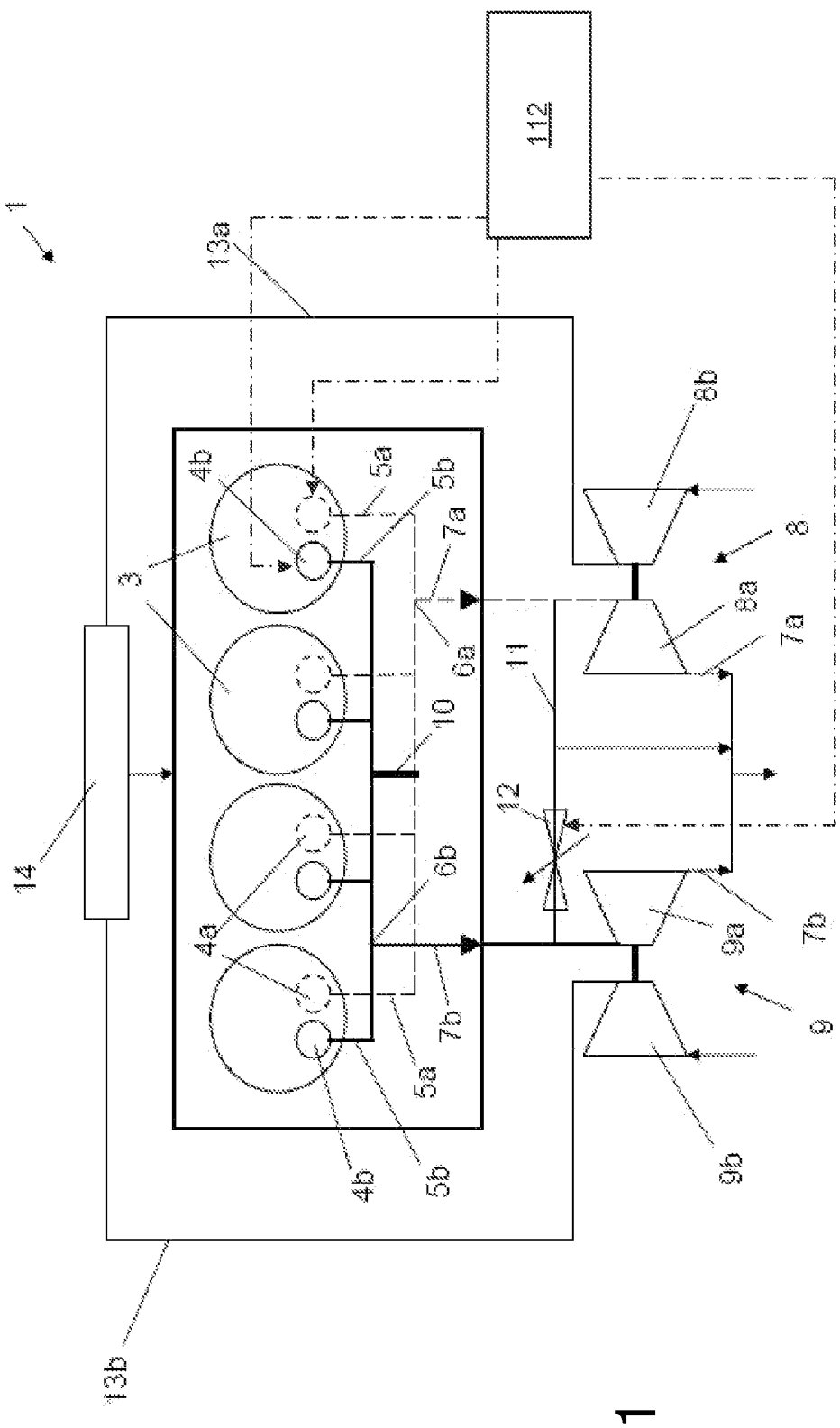
FIG. 1 schematically shows an example embodiment of the internal combustion engine.
Figure 2:
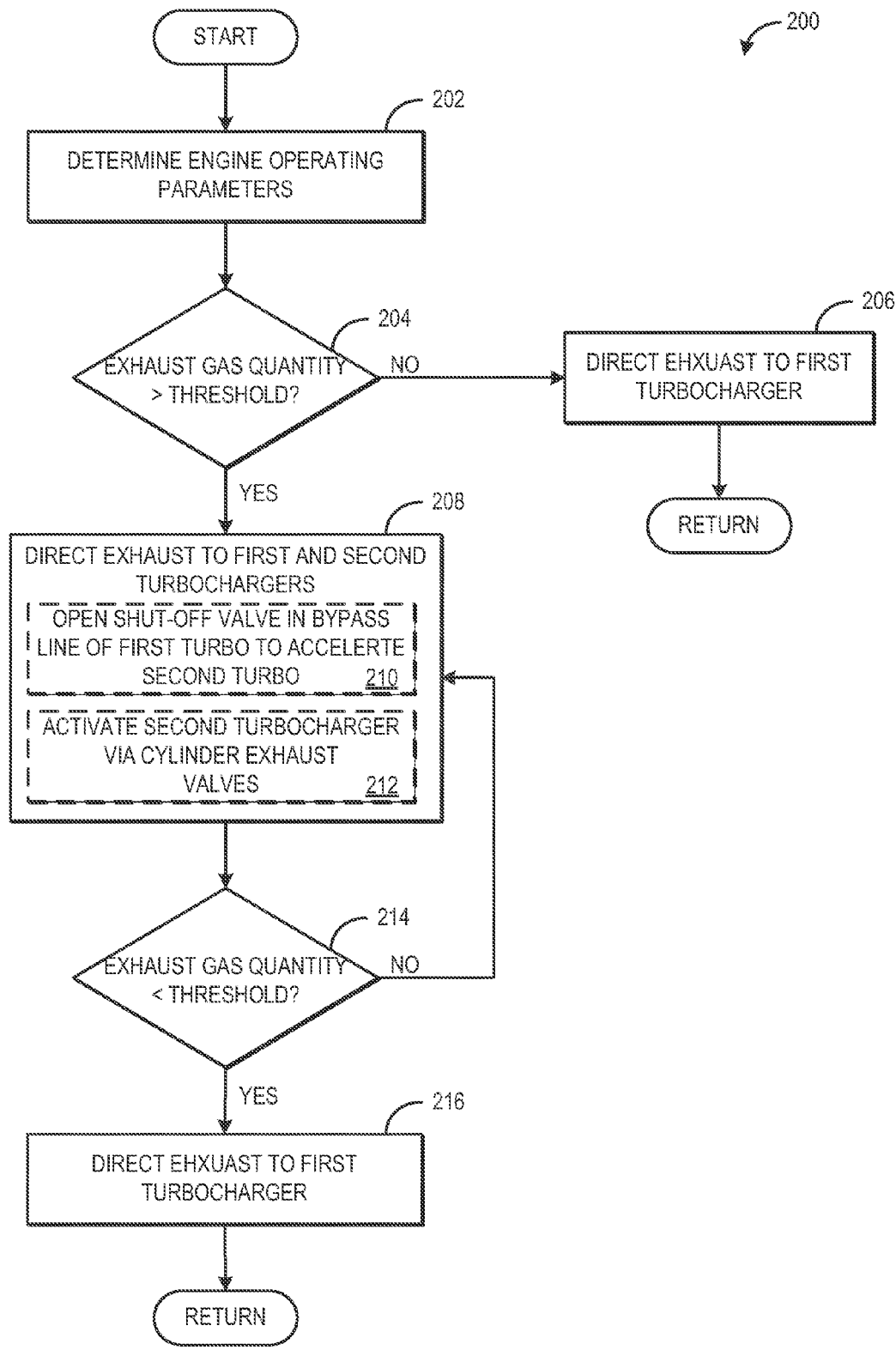
FIG. 2 is a flow chart illustrating an example method for an engine according to an embodiment of the present disclosure.

Embodiments for directing exhaust gas through multiple exhaust manifolds each coupled to a turbocharger are provided. FIG. 1 is an engine diagram illustrating an example embodiment of an internal combustion engine according to the present disclosure. FIG. 2 is a flow chart illustrating an example method which may be carried by the engine of the present disclosure. Within the context of the present disclosure, the expression "internal combustion engine" encompasses in particular spark-ignition engines, but also diesel engines and hybrid internal combustion engines.

FIG. 1 schematically shows an embodiment of the internal combustion engine 1 which is equipped with two exhaust-gas turbochargers 8, 9. Each exhaust-gas turbocharger 8, 9 comprises a turbine 8a, 9a and a compressor 8b, 9b. The hot exhaust gas expands in the turbines 8a, 9a with a release of energy and the compressors 8b, 9b compress the charge air which is supplied to the cylinders 3 via intake lines 13a, 13b and plenum 14, as a result of which a supercharging of the internal combustion engine 1 is realized.

The internal combustion engine 1 shown in FIG. 1 is a four-cylinder in-line engine in which the cylinders 3 are arranged along the longitudinal axis of the cylinder head 2, that is to say in a line. Each cylinder 3 has two outlet openings 4a, 4b, wherein each outlet opening 4a, 4b is adjoined by an exhaust line 5a, 5b for discharging the exhaust gases out of the cylinder 3.

In each case one outlet opening 4a of each cylinder 3 is designed as a switchable outlet opening 4a which is opened during the course of the charge exchange only if the exhaust-gas quantity exceeds a predefined exhaust-gas quantity. In this way, the first turbine 8a arranged downstream is activated, that is to say acted on with exhaust gas. The exhaust lines 5a of the activatable outlet openings 4a of all the cylinders 3 merge, with the formation of a first exhaust manifold 6a, to form a first overall exhaust line 7a which is connected to the turbine 8a of the first exhaust-gas turbocharger 8 (dashed lines).

The exhaust lines 5b of the other outlet openings 4b of all the cylinders 3 merge, with the formation of a second exhaust manifold 6b, to form a second overall exhaust line 7b which is connected to the turbine 9a of the second exhaust-gas turbocharger 9 (solid lines).

In the present case, the exhaust lines 5a, 5b merge to form overall exhaust lines 7a, 7b within the cylinder head 2. As can be seen from FIG. 1, the first exhaust manifold 6a and the second exhaust manifold 6b are permanently connected to one another upstream of the two turbines 8a, 9a via a connecting duct 10 which cannot be closed off.

The connecting duct 10 functions as an overflow duct, via which exhaust gas flows from the second exhaust manifold 6b into the first exhaust manifold 6a. It is thereby ensured that the activatable turbine 8a is acted on with exhaust gas even in the deactivated state, that is to say when the activatable outlet openings 4a are closed. Maintaining a certain minimum rotational speed prevents or reduces the dissipation of the hydrodynamic lubricating film in the plain bearing of the first turbocharger 8, and shortens the acceleration process of the activatable turbine 8a in the event of activation, that is to say when the activatable outlet openings 4a are opened.

According to FIG. 1, the second turbine 9a is designed as a wastegate turbine, the bypass line 11 of which branches off from the second overall exhaust line 7b upstream, bifurcates and opens, upstream of the activatable turbine 8a, also into the first exhaust manifold 6a. By virtue of a shut-off element 12 arranged in the bypass line 11 being opened, the activatable turbine 8a can be accelerated further shortly before its activation.

Controller 112 is shown in FIG. 1 as a conventional microcomputer including a microprocessor unit, input/output ports, read-only memory, random access memory, keep alive memory, and a conventional data bus. Controller 112 may include instructions that are executable to carry out one or more control routines. Controller 112 may receive various signals from sensors coupled to engine 1, such as input from one or more temperature sensors, as well as other sensors not shown in FIG. 1. Example sensors include engine coolant temperature (ECT) from a temperature sensor, a position sensor coupled to an accelerator pedal for sensing accelerator position, a measurement of engine manifold pressure (MAP) from a pressure sensor coupled to an intake manifold of the engine, an engine position sensor from a Hall effect sensor sensing crankshaft position, a measurement of air mass entering the engine from a sensor (e.g., a hot wire air flow meter), and a measurement of throttle position. Barometric pressure may also be sensed for processing by controller 112. In a preferred aspect of the present description, an engine position sensor may produce a predetermined number of equally spaced pulses every revolution of the crankshaft from which engine speed (RPM) can be determined. Controller 112 may also output signals to various actuators of the engine, such as shut-off element 12 and one or more exhaust valves which open to discharge exhaust via the outlet openings 4a, 4b.

An internal combustion engine according to the disclosure may also have two cylinder heads, for example if the cylinders are arranged distributed on two cylinder banks.

The at least one connecting duct may provide only a small exhaust-gas quantity to ensure a minimum rotational speed $n_T$ of the shaft, and may be geometrically dimensioned correspondingly. It is not the object of the activatable turbine in the deactivated state to contribute to the build-up of the charge pressure. The provision of the exhaust-gas quantity required for this purpose is the task not of the connecting duct but rather in fact—when outlet openings are open or activated—that of the first exhaust manifold.

Therefore, examples are advantageous in which the at least one connecting duct which cannot be closed off forms a throttle point which causes a pressure reduction in the exhaust-gas flow passing through the connecting duct. In this way, it is ensured that only a small quantity of exhaust gas passes through the connecting duct, specifically precisely an amount of exhaust gas necessary to maintain a certain minimum rotational speed of the turbine shaft.

The at least one connecting duct may be dimensioned according to its function, that is to say may be designed to be smaller than for example the exhaust line adjoining an outlet opening, which serves to provide an adequate supply of exhaust gas to the turbine with the least possible losses.

Examples of the supercharged internal combustion engine are therefore advantageous in which the smallest cross section $A_{Cross,C}$ of the at least one connecting duct is smaller than the smallest cross section $A_{Cross,Ex}$ of an exhaust line. The flow cross section of a line or of a duct is the parameter which has significant influence on the throughput, that is to say on the quantity of exhaust gas conducted through the connecting duct per unit of time. For comparison purposes, according to the disclosure, said flow cross section is defined as the flow cross section perpendicular to the central filament of flow.

Examples of the supercharged internal combustion engine are advantageous in which the following relationship applies: $A_{Cross,C} \leq 0.3\ A_{Cross,Ex}$. Examples of the supercharged internal combustion engine are advantageous in which the following relationship applies: $A_{Cross,C} \leq 0.2\ A_{Cross,Ex}$, $A_{Cross,C} \leq 0.1\ A_{Cross,Ex}$, or $A_{Cross,C} \leq 0.05\ A_{Cross,Ex}$.

Examples of the supercharged internal combustion engine are advantageous in which the at least one connecting duct which cannot be closed off branches off from an exhaust line of the second exhaust manifold and connects said exhaust line of the second exhaust manifold for example to an exhaust line of the first exhaust manifold or else to the overall exhaust line of the first exhaust manifold.

This also encompasses examples in which the at least one connecting duct which cannot be closed off connects the exhaust line of an activatable outlet opening of one cylinder to the exhaust line of a permanently activated outlet opening of another cylinder.

In accordance with the aim of the disclosure, the desire to transfer, that is to say feed, only small exhaust-gas quantities into the first manifold via the connecting duct, the supply of exhaust gas to the connecting duct via the exhaust line of a single outlet opening is theoretically adequate, wherein owing to the fact that virtually the same exhaust-gas pressure prevails in the entire exhaust system of the second manifold, exhaust gas from other exhaust lines of the second manifold also may pass, or passes, into the connecting duct as a result of a return flow. Nevertheless, the example in question assists the actual aim of obtaining a reduced discharge of exhaust gas via the connecting duct.

A more or less intense return flow of the exhaust-gas fractions discharged from the other outlet openings would be required depending on the location at which the connecting duct branches off from the second manifold.

Since the connecting duct is acted on substantially only with the exhaust gas of a single outlet opening, pulsation may occur in the exhaust-gas flow conducted via the connecting duct. This would yield the disadvantageous effect of the activatable turbine being acted on with a pulsating exhaust-gas flow in the deactivated state.

If the exhaust lines of permanently activated outlet openings are merged to form component exhaust lines before said component exhaust lines merge to form the overall exhaust line, examples may be advantageous in which the at least one connecting duct which cannot be closed off branches off from such a component exhaust line of the second exhaust manifold.

Examples of the supercharged internal combustion engine are also advantageous in which the at least one connecting duct which cannot be closed off branches off from the overall exhaust line of the second exhaust manifold. Examples having a connecting duct which branches off from the overall exhaust line are less susceptible to pulsations in the exhaust-gas flow transferred via the connecting duct.

Here, examples of the supercharged internal combustion engine are advantageous in which the at least one connecting duct which cannot be closed off connects the two overall exhaust lines to one another. In this way, a situation is avoided in which the exhaust-gas flow transferred via the connecting duct may flow again through relatively narrow and possibly multiply curved exhaust lines of individual outlet openings, which would lead to an additional pressure loss. If the two overall exhaust lines are arranged adjacent to one another, said example furthermore considerably shortens the length of the connecting duct.

Examples of the supercharged internal combustion engine are advantageous in which the exhaust lines of the at least two cylinders merge to form the two overall exhaust lines within the cylinder head. As has already been stated, during the course of the design configuration of the exhaust-gas turbocharging, it is sought to arrange the turbines as close as possible to the outlet of the internal combustion engine, that is to say to minimize the length and the volume of the line system upstream of the turbines. Here, an expedient measure is the substantial integration of the exhaust manifolds into the cylinder head, or the merging of the exhaust lines to form overall exhaust lines within the cylinder head.

A cylinder head of said type is characterized by a compact design, with the overall length of the exhaust lines of the exhaust manifold, and the volume of the exhaust lines upstream of the turbine, being reduced. The use of such a cylinder head also leads to a reduced number of components, and consequently to a reduction in costs, in particular assembly and procurement costs. The compact design permits dense packing of the drive unit in the engine bay.

According to the disclosure, it is not necessary for the exhaust lines of all the cylinders of a cylinder head to merge to form two overall exhaust lines; rather, it is necessary for only the exhaust lines of at least two cylinders to be grouped in the described way.

Examples are however particularly advantageous in which the exhaust lines of all the cylinders of the at least one cylinder head merge to form two overall exhaust lines.

Examples of the supercharged internal combustion engine are advantageous in which the at least one cylinder head is connected to the turbines of the at least two exhaust-gas turbochargers via a connecting piece. The connecting piece is connected at one side to the cylinder head and at the other side to the turbines, in a non-positively locking, positively locking and/or coherent manner. Said connecting piece serves for transferring the exhaust gases from the cylinder head into the turbines, that is to say for introducing the exhaust gas into the inlet region of the turbines, for which purpose the exhaust-gas flows may generally also be diverted. Examples are advantageous in which the connecting piece is a cast part.

Here, examples of the supercharged internal combustion engine are advantageous in which the at least one connecting duct which cannot be closed off is integrated into the connecting piece.

Examples of the supercharged internal combustion engine may however also be advantageous in which the at least one connecting duct which cannot be closed off is integrated into the cylinder head. The integration of the connecting duct into another component, for example the cylinder head or the connecting piece, reduces the number of components and also aids in the avoidance of leakages.

In relation to examples with an external duct, it is possible for fastening means and additional sealing elements to be dispensed with.

Examples of the supercharged internal combustion engine are advantageous in which the at least one connecting duct, at the location at which it opens into the first exhaust manifold, is aligned in the direction of the activatable turbine, such that the exhaust-gas flow emerging from the connecting duct impinges directly on the turbine rotor without any significant diversion.

Examples of the supercharged internal combustion engine are advantageous which are equipped with an at least partially variable valve drive, preferably with a fully variable valve drive, for the actuation of the outlet openings.

In supercharged internal combustion engines in which the at least one cylinder head can be connected at an assembly end side to a cylinder block and in which the exhaust lines of the at least two cylinders merge to form the two overall exhaust lines within the cylinder head, examples are advantageous which are characterized in that one overall exhaust line is arranged on that side of the other overall exhaust line which faces away from the assembly end side. The overall exhaust lines are in a sense situated—in the direction of the cylinder longitudinal axis—one above the other, if appropriate offset with respect to one another.

Said example is particularly suitable for the use of a connecting piece of the above-stated type, because the two overall exhaust lines emerge from the cylinder head close to one another, which permits a compact and therefore small-volume and lightweight design of the connecting piece.

Here, examples of the supercharged internal combustion engine are advantageous in which one exhaust-gas turbocharger is arranged laterally adjacent to the cylinder head and the other exhaust-gas turbocharger is arranged laterally adjacent to the cylinder block. This configuration ensures a close-coupled arrangement of both turbines, one above the other in the direction of the cylinder longitudinal axis, and dense packaging of the drive unit as a whole.

Examples of the supercharged internal combustion engine are advantageous in which the at least one cylinder head is equipped with an integrated coolant jacket. Supercharged internal combustion engines are thermally more highly loaded than naturally aspirated engines, as a result of which greater demands are placed on the cooling arrangement.

It is fundamentally possible for the cooling arrangement to take the form of an air-cooling arrangement or a liquid-cooling arrangement. On account of the significantly higher heat capacity of liquids in relation to air, it is possible for significantly greater heat quantities to be dissipated by means of liquid cooling than is possible with air cooling.

Liquid cooling requires the internal combustion engine or the cylinder head to be equipped with an integrated coolant jacket, that is to say the arrangement of coolant ducts which conduct the coolant through the cylinder head. The heat is dissipated to the coolant, generally water provided with additives, already in the interior of the cylinder head. Here, the coolant is fed by means of a pump arranged in the cooling circuit, such that said coolant circulates in the coolant jacket. The heat which is dissipated to the coolant is in this way dissipated from the interior of the cylinder head and extracted from the coolant again in a heat exchanger.

The turbines that are used may be equipped with a variable turbine geometry which, by adjustment, can be adapted to the respective operating point of the internal combustion engine.

In particular, the second turbine may also be designed as a wastegate turbine, in which exhaust gas is conducted past the turbine via the bypass line as soon as the exhaust-gas mass flow exceeds a threshold value. For this purpose, a shut-off element may be provided in the bypass line. The bypass line may open into one of the two overall exhaust lines downstream of the turbines, or in another embodiment, may also open into the first exhaust manifold upstream of the first turbine. In embodiments of the latter type, the bypass line may then advantageously be utilized to accelerate the first activatable turbine shortly before its activation, by virtue of the bypass line being opened.

Thus, the system of FIG. 1 provides for an engine system comprising at least two in-line cylinders, each cylinder having a first and second exhaust port; a first integrated exhaust manifold directing exhaust from the first exhaust port of each cylinder to a first turbocharger; a second integrated exhaust manifold directing exhaust from the second exhaust port of each cylinder to a second turbocharger; and a connecting duct coupling the first and second integrated exhaust manifolds upstream of the first and second turbochargers. The system also includes a shut-off element arranged in a bypass line between the first and second turbochargers, the shut-off element configured to open in order to divert a portion of the exhaust from the first integrated exhaust manifold to the second turbocharger.

FIG. 2 illustrates a method 200 for an engine having a first and second turbocharger, such as engine 1. Method 200 may be carried out according to instructions stored in the memory of controller 112. Method 200 includes, at 202, determining engine operating parameters. Engine operating parameters may include engine speed, engine load, engine temperature, MAP, exhaust gas backpressure, etc. At 204, it is determined if an exhaust-gas quantity exceeds a threshold.

In a non-supercharged internal combustion engine, the exhaust-gas quantity corresponds approximately to the rotational speed and/or the load of the internal combustion engine, specifically as a function of the load control used in the individual situation. In a traditional spark-ignition engine with quantity regulation, the exhaust-gas quantity increases with increasing load even at a constant rotational speed, whereas in traditional diesel engines with quality regulation, the exhaust-gas quantity is dependent merely on rotational speed, because in the event of a load shift at constant rotational speed, the mixture composition and not the mixture quantity is varied.

If the internal combustion engine according to the disclosure is based on quantity regulation, in which the load is controlled by means of the quantity of fresh mixture, the exhaust-gas quantity may exceed the relevant, that is to say predefinable, exhaust-gas quantity even at constant rotational speed if the load of the internal combustion engine exceeds a predefinable load, because the exhaust-gas quantity correlates with load, wherein the exhaust-gas quantity increases with increasing load and falls with decreasing load.

In contrast, if the internal combustion engine is based on quality regulation, in which the load is controlled by means of the composition of the fresh mixture and the exhaust-gas quantity varies virtually exclusively with rotational speed, that is to say is proportional to the rotational speed, the exhaust-gas quantity exceeds the predefinable exhaust-gas quantity independently of the load if the rotational speed of the internal combustion engine exceeds a predefinable rotational speed.

The internal combustion engine according to the disclosure is a supercharged internal combustion engine, such that consideration may also be given to the charge pressure on the intake side, which may vary with the load and/or the rotational speed and which has an influence on the exhaust-gas quantity. The relationships discussed above regarding the exhaust-gas quantity and the load or rotational speed consequently apply only conditionally in this general form. The method according to the disclosure is therefore geared very generally to the exhaust-gas quantity and not to the load or rotational speed.

If it is determined that the exhaust gas quantity does not exceed the threshold, that is if the exhaust gas quantity is small enough that routing it through one turbine, as opposed to two, will not cause excessive backpressure and/or damage to the turbine, method 200 proceeds to 206 to direct the exhaust gas to the first turbocharger via the first exhaust manifold. In doing so, the exhaust gas is prevented from traveling through the second turbocharger. Upon directing the exhaust gas to the first turbocharger, method 200 returns.

If it is determined that the exhaust gas quantity does exceed the threshold, method 200 proceeds to 208 to direct the exhaust to both the first and second turbochargers via the first and second exhaust manifolds. In this way, a portion of the exhaust will be directed to the turbine of the first turbocharger while a portion of the exhaust gas is directed to the turbine of the second turbocharger.

Directing the exhaust to the second turbocharger may include opening a shut-off element, such as shut-off element 12, in a bypass line between the first and second turbochargers at 210. In this way, prior to activation of the second turbocharger, the shut-off element may be opened so that a portion of the exhaust from the first intake manifold may be routed to the second turbocharger to start acceleration of the second turbocharger.

Directing the exhaust gas to the second turbocharger may include controlling one or more cylinder exhaust valves at 212. As explained with respect to FIG. 1, each cylinder may include an exhaust line coupled to the first turbocharger and an exhaust line coupled to the second turbocharger. During engine operation with exhaust gas quantity below the threshold, the cylinder exhaust valves of the exhaust lines coupled to the first turbocharger may be opened during each exhaust stroke while the cylinder exhaust valves of the exhaust lines coupled to the second turbocharger may kept closed, and as such all the exhaust in the cylinder may be released to the first turbocharger. However, when the exhaust gas quantity exceeds the threshold, the cylinder exhaust valves of the exhaust lines coupled to the second turbocharger may also be opened during each exhaust stroke so that a portion of the exhaust is directed to the second turbocharger in addition to the first turbocharger.

At 214, it is determined if the exhaust gas quantity has dropped below the threshold. If no, method 200 returns to 208 to direct the exhaust to the first and second turbochargers. If yes, method 200 proceeds to 216 to direct the exhaust gas to the first turbocharger (and not the second) by preventing opening of the exhaust valves of the exhaust lines coupled to the second turbocharger. Method 200 then returns.

The activation of the outlet openings equates to the activation of the first turbine. A preceding acceleration of the activatable turbine via the bypass line of a second turbine designed as a wastegate turbine remains unaffected by this.

If the exhaust-gas quantity falls below the predefinable exhaust-gas quantity again, the activatable outlet openings, and with these the activatable turbine, are deactivated again.

Method variants are advantageous in which the activatable outlet openings are activated when the exhaust-gas quantity exceeds a predefinable exhaust-gas quantity and is greater than said predefined exhaust-gas quantity for a predefinable time period $\Delta t_1$.

The introduction of an additional condition for the activation of the first turbine is intended to prevent excessively frequent switching, in particular an activation of the activatable outlet openings, if the exhaust-gas quantity only briefly exceeds the predefined exhaust-gas quantity and then falls again or fluctuates around the predefined value for the exhaust-gas quantity, without the exceedance justifying an activation of the first turbine.

For the reasons stated above, method variants are also advantageous in which the activatable outlet openings are deactivated when the exhaust-gas quantity falls below a predefinable exhaust-gas quantity and is lower than said predefined exhaust-gas quantity for a predefinable time period $\Delta t_2$.

If the second turbine is a wastegate turbine, the bypass line of which opens into the first exhaust manifold upstream of the first turbine, embodiments of the method are advantageous in which the first activatable turbine is accelerated shortly before its activation, by virtue of a shut-off element arranged in the bypass line being opened.

Thus, the method 200 of FIG. 2 provides for a method for an engine having a first and second turbocharger. The method comprises directing exhaust gas from the engine to the first turbocharger via a first integrated exhaust manifold; and, during select conditions, directing a first portion of the exhaust gas via the first integrated manifold to the second turbocharger, and directing a second portion of the exhaust gas via a second integrated manifold to the second turbocharger. The method includes wherein the select conditions comprise engine speed and load above a threshold. The method also includes wherein directing the first portion of the exhaust gas via the first integrated manifold to the second turbocharger further comprises opening a shut-off element in a bypass line between the first and second turbochargers.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A supercharged internal combustion engine, comprising:
    at least one cylinder head with at least two cylinders, wherein each cylinder has at least two outlet openings for discharging exhaust gases, at least one of which outlet openings is designed as an activatable outlet opening, and each outlet opening is adjoined by an exhaust line having a smallest cross section $A_{Cross,Ex}$;
    a first exhaust manifold in which the exhaust lines of the activatable outlet openings of the at least two cylinders merge, to form a first overall exhaust line which is connected to a turbine of a first exhaust-gas turbocharger;
    a second exhaust manifold in which the exhaust lines of the other outlet openings of the at least two cylinders merge, to form a second overall exhaust line which is connected to a turbine of a second exhaust-gas turbocharger, wherein the first exhaust manifold and the second exhaust manifold are permanently connected to one another upstream of the two turbines via at least one connecting duct which is permanently open, wherein the at least one connecting duct is integrated into the cylinder head, and wherein a smallest cross section $A_{Cross,C}$ of the at least one connecting duct is smaller than $A_{Cross,Ex}$; and a bypass line connecting the first exhaust manifold to the second exhaust manifold including a shut off element arranged in the bypass line, the bypass line positioned downstream of the cylinder head and upstream of the first exhaust-gas turbocharger and the second exhaust-gas turbocharger.

2. The supercharged internal combustion engine as claimed in claim 1, wherein the at least one connecting duct forms a throttle point which leads to a pressure reduction in exhaust-gas flow passing through the at least one connecting duct.

3. The supercharged internal combustion engine as claimed in claim 1, wherein the following relationship applies: $A_{Cross,C} \leq 0.2\, A_{Cross,Ex}$.

4. The supercharged internal combustion engine as claimed in claim 1, wherein the following relationship applies: $A_{Cross,C} \leq 0.1\, A_{Cross,Ex}$.

5. The supercharged internal combustion engine as claimed in claim 1, wherein the following relationship applies: $A_{Cross,C} \leq 0.05\, A_{Cross,Ex}$.

6. The supercharged internal combustion engine as claimed in claim 1, wherein the at least one connecting duct branches off from an exhaust line of the second exhaust manifold.

7. The supercharged internal combustion engine as claimed in claim 1, wherein the at least one connecting duct branches off from the second overall exhaust line of the second exhaust manifold.

8. The supercharged internal combustion engine as claimed in claim 1, wherein the exhaust lines of the at least two cylinders merge to form the two overall exhaust lines within the cylinder head.

9. The supercharged internal combustion engine as claimed in claim 1, wherein the at least one cylinder head is connected to the turbines of the two exhaust-gas turbochargers via a connecting piece.

10. The supercharged internal combustion engine as claimed in claim 9, wherein the at least one connecting duct is integrated into the connecting piece.

11. The supercharged internal combustion engine as claimed in claim 1, in which the at least one cylinder head is connected at an assembly end side to a cylinder block and in which the exhaust lines of the at least two cylinders merge to form the two overall exhaust lines within the cylinder head, wherein one overall exhaust line is arranged on that side of the other overall exhaust line which faces away from the assembly end side.

12. The supercharged internal combustion engine as claimed in claim 11, wherein one of the first and second exhaust-gas turbochargers is arranged laterally adjacent to the cylinder head and the other exhaust-gas turbocharger is arranged laterally adjacent to the cylinder block.

13. The supercharged internal combustion engine as claimed in claim 1, further comprising a controller including instructions to activate the activatable outlet openings, which are deactivated in the case of a low exhaust-gas quantity, when the exhaust-gas quantity exceeds a predefinable exhaust-gas quantity.

14. An engine system, comprising:
at least one cylinder head with at least two in-line cylinders, each cylinder having a first and second exhaust port, each exhaust port adjoined by an exhaust line having a smallest cross section $A_{Cross,Ex}$;
a first integrated exhaust manifold directing exhaust from the first exhaust port of each cylinder to a first turbocharger;
a second integrated exhaust manifold directing exhaust from the second exhaust port of each cylinder to a second turbocharger; and
a connecting duct coupling the first and second integrated exhaust manifolds upstream of the first and second turbochargers,
wherein the connecting duct is integrated into the cylinder head, and wherein a smallest cross section $A_{Cross,C}$ of the connecting duct is smaller than $A_{Cross,Ex}$.

15. The engine system of claim 14, further comprising a shut-off element arranged in a bypass line between the first and second turbochargers and downstream of the cylinder head, the shut-off element configured to open in order to divert a portion of the exhaust from the first integrated exhaust manifold to the second turbocharger.

16. A method for an engine having a first and second turbocharger, comprising:
directing exhaust gas from the engine to the first turbocharger via a first integrated exhaust manifold; and
during select conditions,
directing a first portion of the exhaust gas via the first integrated exhaust manifold to the second turbocharger via a permanently open connecting line integrated in a cylinder head, and
directing a second portion of the exhaust gas via a second integrated exhaust manifold to the second turbocharger,
wherein a smallest cross section $A_{Cross,C}$ of the connecting line is smaller than a smallest cross section $A_{Cross,Ex}$ of an exhaust line.

17. The method of claim 16, wherein the select conditions comprise engine speed and load above a threshold, the method further comprising directing another portion of the exhaust gas via another bypass line from the first turbocharger to the second turbocharger via a shut-off element arranged in the bypass line, said another bypass line arranged downstream of the cylinder head.

18. The method of claim 16, wherein directing the first portion of the exhaust gas via the first integrated manifold to the second turbocharger further comprises opening a shut-off element in a bypass line between the first and second turbochargers.

* * * * *